United States Patent [19]
Denton et al.

[11] 3,984,767
[45] Oct. 5, 1976

[54] METHOD AND APPARATUS FOR TESTING ANODE FLATNESS BY CAPACITANCE MEASUREMENT

[75] Inventors: David Alan Denton; John Hubert Entwisle; Dennis Humphrey, all of Runcorn, England

[73] Assignee: Imperial Chemical Industries Limited, London, England

[22] Filed: Oct. 4, 1974

[21] Appl. No.: 512,482

[30] Foreign Application Priority Data
Oct. 22, 1973  United Kingdom............... 49008/73

[52] U.S. Cl............................. 324/61 R; 29/593; 324/61 P
[51] Int. Cl.² .................. G01R 27/26; G01N 27/22
[58] Field of Search........... 324/61 R, 61 P, 61 QL, 324/61 QS, 65 R, 65 CR, 65 P, 65 CP, 60 C, 60 R, 71 SN, 158 P; 29/593; 73/104

[56] References Cited
UNITED STATES PATENTS

| | | |
|---|---|---|
| 2,872,640 | 2/1959 | Eppler............................. 324/61 P |
| 3,257,591 | 6/1966 | Hardy et al....................... 324/61 P |
| 3,348,313 | 10/1967 | Urmenyi........................... 324/61 P |
| 3,426,272 | 2/1969 | Griffin............................. 324/61 P |

Primary Examiner—John K. Corbin
Assistant Examiner—Wm. H. Punter
Attorney, Agent, or Firm—Cushman, Darby & Cushman

[57] ABSTRACT

A method and apparatus for assessing the flatness of a metal anode (e.g. a foraminous titanium anode) which comprises measuring the capacitance of the electrical capacitor formed by urging towards each other under a predetermined load the working surface of said anode and a rigid plane sheet of an electrically conducting material (e.g. copper) as the other plate of the capacitor with a sheet of dielectric material (e.g. polytetrafluoroethylene) therebetween. The apparatus is preferably provided with a compensating weight device to offset the additional weight of the anode current lead-in rod.

10 Claims, 4 Drawing Figures

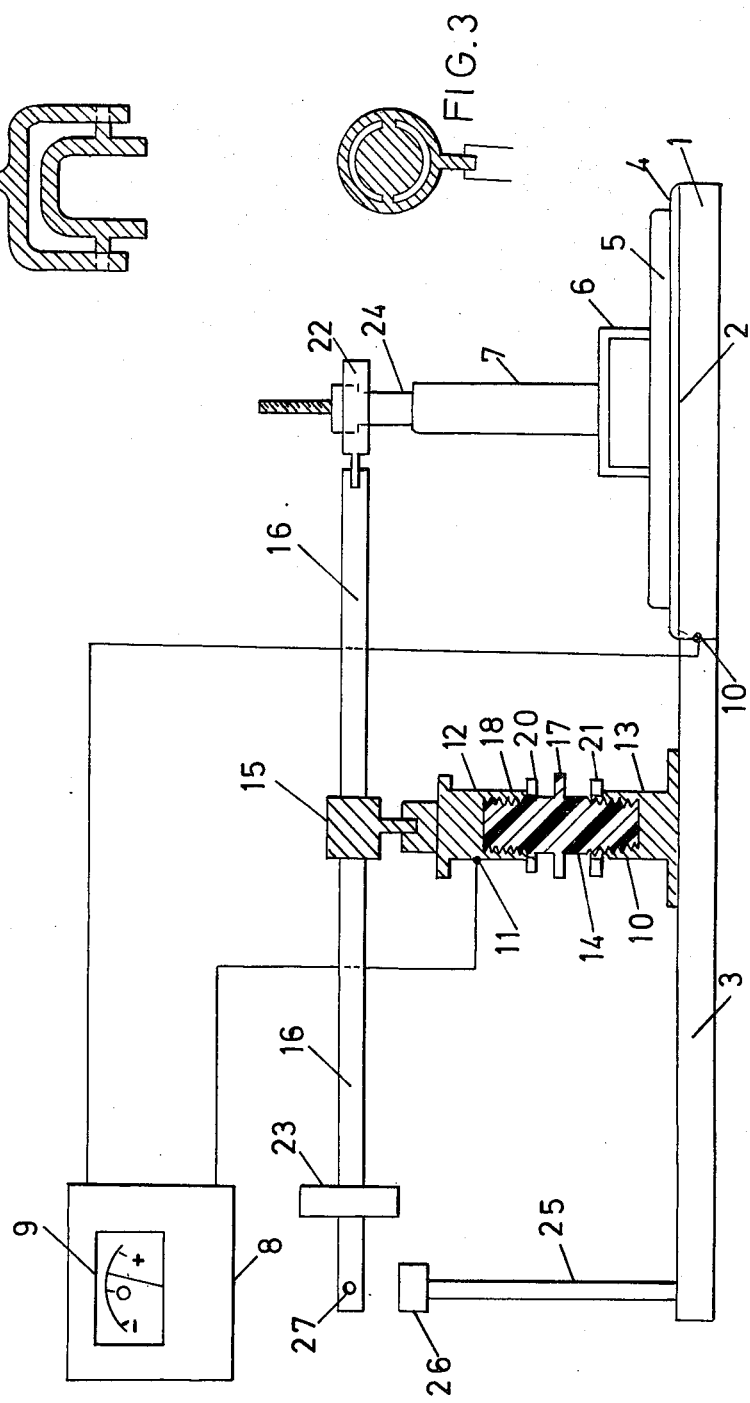
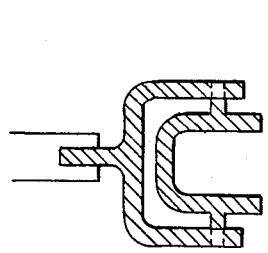

METHOD AND APPARATUS FOR TESTING ANODE FLATNESS BY CAPACITANCE MEASUREMENT

The present invention relates to a method of measuring the flatness of anodes. More particularly it relates to a method of measuring the flatness of metal anodes, especially anodes made from a film-forming metal.

It has been recent practice, particularly in cells electrolysing aqueous solutions of alkali metal chlorides, and especially in mercury cells, to use anodes comprising a combination of a film-forming metal support (usually titanium) an electrocatalytically active coating thereon (for example a platinum metal oxide coating). Such anodes may advantageously be used in the electrolysis of alkali metal chloride solutions since they have both low chlorine overpotential characteristics and high resistance to chemical attack in use. Nevertheless, it is necessary in time to replace or re-coat the anodes in order to maintain optimum performance. The used anodes may be refurbished by subjecting them to successive operations of removing the old coating (for example by treatment with molten alkali metal hydroxide/alkali metal hydride as described in the specification of our UK Patent 1,312,375), flattening and re-coating (for example with a platinum metal oxide). The flattening operation is necessary because anodes become distorted in use, and it is essential, especially in mercury cells, to ensure that the flatness of the anodes is controlled within predetermined limits in order to keep the anode/cathode gap at a minimum. The flattening of the used anodes may be carried out by a variety of techniques, for example hand flattening and/or machining.

The refurbished anodes, and new anodes, are finally checked for flatness before installing into the cell. The flatness of the anode may be assessed, for example, by use of a planetary fixture measuring device which comprises a sensing device adapted to transverse the surface of the anode and which is adapted to be displaced vertically in response to changes in contour of the said surface. The planetary fixture measuring method is time-consuming, requires skilled operators, and the measurements are limited to the particular paths traversed.

We have now devised a method of assessing the flatness of an anode which is rapid and simple to operate, and which provides an assessment of the flatness of the anode as a whole.

According to the present invention we provide a method of assessing the flatness of an anode which comprises measuring the capacitance of the electrical capacitor formed by urging towards each other under a predetermined load the working surface of the said anode as one plate of the capacitor and a rigid plane sheet of an electrically conducting material as the other plate of the capacitor with a sheet of dielectric material therebetween.

The rigid plane sheet may suitably be a flat conducting plate of copper, iron or steel. It is especially convenient to use a flat plate of cast iron.

A wide range of insulating materials may be used as the sheet of dielectric material, for example polyethylene, polytetrafluoroethylene or other fluorinated ethylene polymers, glass or mixtures thereof.

The sheet of dielectric material is preferably thin to achieve the desired sensitivity of capacitance measurement and should be of uniform thickness, for example a sheet in the range 0.003 to 0.2 inch thickness, and suitably 0.005 inch thickness, eg with ± 0.0005 inch tolerance. A mat of glass fibre impregnated with polytetrafluoroethylene is especially suitable for use as the sheet of dielectric material.

The predetermined load may conveniently be the weight of the anode itself. In a typical anode assembly, comprising for example a foraminous anode plate carrying a bridge piece on which is mounted a hollow tube for insertion of the current lead-in means, the predetermined load would be the weight the anode plate and its associated bridge piece and hollow tube. In some cases, it is more convenient to test the anodes after the current lead-in means has been inserted, in which case the same predetermined load may be obtained by providing a weight compensating means to offset the additional weight of the current lead-in means, for example by inducing an upthrust on the anode under test which is equal to the aforesaid additional weight.

The capacitance may be measured in a conventional manner using a ratio arm capacitance bridge, for example a Wayne Kerr bridge.

Thus according to a further aspect of the present invention we provide an apparatus for assessing the flatness of an anode which comprises a rigid plane sheet of an electrically conducting material, a sheet of dielectric material superimposed on said sheet of conducting material, a compensating weight means for urging the working surface of the anode and the said sheets towards one another under a predetermined load and means for measuring the capacitance of the capacitor formed by the working surface of the anode and the sheet of the electrically conducting material with the sheet of dielectric material therebetween.

The apparatus for carrying out the method of assessing anode flatness according to the invention conveniently comprises a baseplate of an electrically conducting material on which is superimposed and held in position a sheet of dielectric material. The dielectric material is conveniently obtained as thin sheeting which may be rolled on to a spool. A supply of sheeting may conveniently be presented to the surface of the aforesaid baseplate by positioning a full spool at one side of the baseplate and an empty spool at the other side thereof and moving the sheet across the baseplate as required. The apparatus is conveniently provided with a housing for the capacitance measuring means and a vertical support for the weight compensating device. The latter conveniently comprises, for example, a pivotally mounted balance arm carrying at one end a weight equal to the compensating load required (e.g. the weight of the current lead-in means) and at the other end a clamping means adapted to engage the anode to be tested when in position on the dielectric sheet in such a manner as to provide the compensating upthrust required to effect the application of the aforesaid predetermined load to the anode.

In use, the apparatus is calibrated by measuring the capacitance of several anodes of varying flatness (the flatter the anode, the higher the capacitance) in order to determine a reference value of capacitance corresponding to an anode of satisfactory flatness. Subsequent anodes are then accepted if their capacitance, as measured by the method according to the invention, is greater than or equal to the aforesaid reference value of capacitance. The anodes are rejected if their capacitance is less than the aforesaid reference value.

The method according to the invention is especially applicable to assessing the flatness of anodes comprising a foraminous structure of a film-forming metal which, when in use in a cell, is coated with an electrocatalytically active coating. The measurement of flatness may be carried out on coated or uncoated anodes.

In this specification, by "a film-forming metal" we mean one of the metals titanium, zirconium, niobium, tantalum or tungsten or an alloy consisting principally of one of these metals and having anodic polarisation properties which are comparable to those of the pure metal. It is preferred to use titanium alone or an alloy based on titanium and having polarisation properties comparable to those of titanium. Examples of such alloys are titanium-zirconium alloys containing up to 14% of zirconium, alloys of titanium with up to 5% of a platinum group metal such as platinum, rhodium or iridium and alloys of titanium with niobium or tantalum containing up to 10% of the alloying constituent.

The electrocatalytically active coating is a conductive coating which is resistant to electrochemical attack but is active in transferring electrons between electrolyte and the anode.

The electrocatalytically active material may suitably consist of one or more platinum group metals, ie platinum, rhodium, iridium, ruthenium, osmium and palladium, and alloys of the said metals, and/or the oxides thereof, or another metal or a compound which will function as an anode and which is resistant to electrochemical dissolution in the cell, for instance rhenium, rhenium trioxide, magnetite, titanium nitride and the borides, phosphides and silicides of the platinum group metals. The coating comprising an operative electrode material may also contain electronically non-conducting oxides, particularly oxides of the anode metals such as titanium and/or of other metals, such as tin, as is known in the art, to anchor the operative electrode material more securely to the supporting film-forming structure and the increase its resistance to dissolution in the working cell.

Preferred coatings include platinum, platinum-/iridium alloys, platinum group metal oxides, particularly ruthenium oxide, and especially mixtures of platinum group metal oxides and film-forming metal oxides, for example ruthenium oxide and titanium dioxide. The platinum metal coatings may be formed, for example, by electrodeposition on the film-forming metal, for example as described in UK Patent No. 1,237,077. Platinum group metals and their conducting compounds, particularly oxides, are readily produced by thermal decomposition techniques, as described for example in UK Patent Nos. 1,147,442; 1,195,871; 1,206,863 and 1,244,650.

The foraminous structure comprising the anode may conveniently be built up from parallel elongated members of film-forming metal which are mounted on support means forming part of the anode. The said members may, for example be in the form of blades or strips, rods, or channel members of U-shape, inverted U-shape or hemicylindrical shape. An especially preferred anode comprises a foraminous structure in the form of double blades which are spaced apart and connected to one another by one or more bridge portions suitable for strengthening purposes and/or for connecting to said support means. Alternatively, the elongated members of the foraminous structure may be in the form of louvre slats pressed out from a sheet of the film-forming metal.

The aforesaid elongated members are coated with an electrocatalytically active coating of the type defined above.

Typical anode assemblies comprising the aforesaid foraminous structures include those in which the support means is in the form of a conductor bar of a film-forming metal and of an inverted channel shape which is conductively connected at its free ends thereof to the foraminous structure, and which is further conductively connected to a tube of a film-forming metal suitable for accommodating a current lead-in rod (for example of copper, steel or aluminum) conductively bonded to said tube. Such anode assemblies are described in the specifications of our UK Patents 1,304,518 and 1,313,298.

By way of example, embodiments suitable for carrying out the method according to the invention of assessing the flatness of anodes will now be described with reference to the accompanying drawings FIGS. 1 to 4 in which:

FIG. 2 is a schematic diagram (part in section) of a further embodiment incorporating a compensating weight device showing an anode (with its associated current lead-in means) in position for testing;

FIG. 3 is an enlarged view in vertical section of the gyro-pivot 15 shown schematically in FIG. 2;

FIG. 5 is an enlarged view in vertical section of the gyro-fork 22 shown schematically in FIG. 2.

Figure 1:
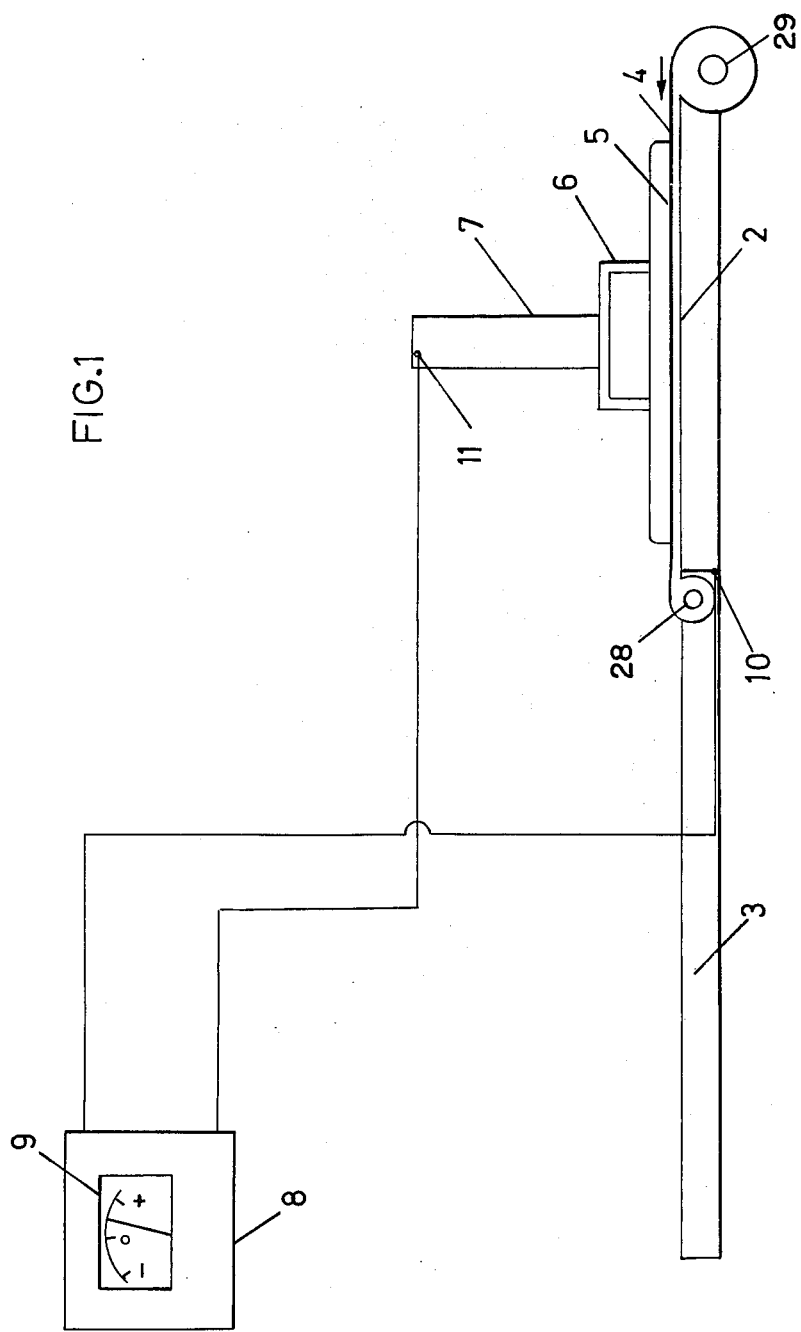
FIG. 1 is a schematic diagram of one embodiment showing an anode (without its associated current lead-in means) in position for testing.

Referring to FIG. 1, a rigid metal sheet 1, conveniently of cast iron, having a flat surface 2, is mounted in a metal base frame 3, conveniently of mild steel. The flat surface 2 is covered with a thin dielectric sheet 4, for example a sheet of polyethylene, glass or glass fibre impregnated with polytetrafluoroethylene. When the dielectric sheet 4 is flexible, for example polyethylene or glass fibre impregnated with polytetrafluoroethylene, it is convenient to present the sheet 4 to the surface 2 by feeding the flexible sheet between spools 28 and 29 positioned either side of the said surface 2.

FIG. 1 shows a typical metal anode in position on the dielectric sheet 4. The anode comprises a working surface 5 (for example a foraminous structure), a bridge piece 6 and a hollow tube 7 adapted to receive a current lead-in rod. The working surface 5, bridge piece 6 and hollow tube 7 are all of metal, for example titanium.

A ratio arm capacitance bridge 8, for example a Wayne Kerr bridge, is mounted on a support framework (not shown) with a meter 9 visible to the operator. The capacitance bridge is connected by one lead to the metal sheet 1 at 10 and by a second lead to the metal anode at 11, the said connections 10 and 11 being made by any convenient means, for example metal connector clips.

The apparatus is calibrated by measuring the capacitance of several anodes of varying flatness in order to determine a reference value of capacitance which corresponds to the capacitance of an anode having the required standard of flatness (for example as measured by the planetary fixture method). The meter 9 is then adjusted to give zero centre reading corresponding to the aforesaid reference value.

The capacitance of an anode to be tested is then measured by placing the anode on the dielectric sheet 4 and observing whether the capacitance as indicated by the meter 9 is more positive than the zero centre reading (ie a greater capacitance than the reference capacitance) whence the anode under test is accepted as having satisfactory flatness, or whether the capacitance as indicated by the meter 9 is negative with respect to the zero centre reading (ie a lower capacitance than the reference capacitance) whence the anode under test is rejected.

Referring to FIG. 2, a column consisting of an upper metal portion 12, a lower metal portion 13 and a screw member 14 intermediate of the two portions 12 and 13, is mounted on the frame 3. The upper portion 12 carries a gyro-pivot 15 (shown in more detail in FIG. 3) which serves as a fulcrum for a counter-balance arm 16. The screw member 14 carries a knurled knob 17 and is provided with an upper right hand threaded portion 18 and a lower left hand threaded portion 19, the said threaded portions engaging respectively with corresponding internal threaded portions in the metal portions 12 and 13. The screw member 14 is further provided with locking nuts 20, 21 adapted to engage the the lower end of portion 12 and the upper end of portion 13 respectively. The height of the gyro-pivot 15 may be raised or lowered by rotating the knob 17 in a clockwise or an anit-clockwise direction respectively. Once the height of the gyro-pivot 15 is correctly adjusted (see later), the screw member 14 is then locked in position by means of the locking nuts 20, 21. The metal portions 12, 13, the gyro-pivot 15, the counter-balance arm 16 and the locking nuts 20, 21, are conveniently of mild steel. The screw member 14 and the knob 17 are of an electrically insulating material, for example "Tufnol" (a laminated plastics material bonded with synthetic resins), to prevent electrical contact between the metal counter-balance arm 16 and the metal sheet 1.

The capacitance bridge 8 is connected at 10 to the metal sheet 1 and to the upper metal portion 12 at 11, conveniently by means of connector clips.

The counter-balance arm 16 is provided at its right-hand end (as shown in FIG. 2) with a gyro-fork 22 (shown in more detail in FIG. 4) which serves as a clamping means for an anode (fitted with a current lead-in rod 24) to be tested. The left-hand end of the counter-balance arm 16 is provided with an adjustable weight 23 which can be moved by any convenient means along the arm 16, thereby counter-balancing the additional weight of the current lead-in rod 24. The weight 23 may, for example, be slidably moved along the counter-balance arm 16 either manually or by means of a rotatable screw device.

A column 25, conveniently of mild steel is mounted on the base frame 3 and carries an upper platform 26 which serves as a stop to limit the downward movement of the left-hand end of the counter-balance arm 16 when the gyro-fork 22 is disengaged from the anode to be tested. The platform 25 is constructed in an electrically insulating material, for example Tufnol, to prevent electrical contact between the counter-balance arm 16 and the metal plate 1.

When the counter-balance arm 16 is not engaged with the anode, it will tilt so that its left-hand end will rest on the platform 26. In use, the counter-balance arm 16 is engaged with the anode to be tested and the anode is subsequently lowered on to the dielectric sheet 4. The purpose of the screw-member 14 is to adjust the height of the gyro-pivot 15 so that the counter-balance arm is horizontal when the anode to be tested is in position on the dielectric sheet 4.

The gyro-pivot 15 and the gyro-fork 22 ensure that the counter-balance arm 16 is freely movable in all planes, thereby assisting correct location of the anode to be tested on to the dielectric plate 4. As a further aid to locating the anode correctly, limit electrical contact switches (represented diagrammatically as 27) are positioned one on either side of the left-hand end of the counter-balance arm 16, the said limit switches 27 being connected to an electric light indicator circuit (not shown). If the anode is not centrally located on to the dielectric sheet 4, the left-hand end of the counter-balance arm 16 swings sideways to engage either one or the other of the limit switches 27, thereby actuating the electric light indicator.

The apparatus shown in FIG. 2 is first adjusted to ensure that the counter-balance arm 16 is level when the anode to be tested is in position on the dielectric sheet 4 (as described above). The apparatus is then calibrated by measuring the capacitance of a range of anodes of varying flatness, each anode being fitted with a current lead-in rod 24, in order to obtain a reference value of capacitance corresponding to an anode having the desired flatness (as described above). The meter 9 is then adjusted to give a zero centre-reading corresponding to this reference capacitance and the capacitance of the anodes to be tested, relative to this zero reading, is then measured.

It is necessary to re-determine the capacitance reference value when replacing the dielectric sheet 4 by a new supply of the same material, or by a different material.

The invention is further illustrated by the following Examples.

EXAMPLES 1 TO 4

The anodes tested had a plurality of parallel double titanium blades as the working surface in conjunction with a titanium bridge piece and a titanium tube (with or without the copper lead-in rod). The capacitance apparatus was calibrated against reference anodes of the same type in which the distance between the lowest and highest points on the working surface did not exceed 0.5 mm (as determined by the planetary fixture method), and the meter zero set corresponding to this capacitance. All the anodes tested were manufactured with a view to meeting this desired standard of flatness. None of the anodes was coated with an electrocatalytically active material.

The measurements were carried out using three different dielectric sheets, viz
  i. polytetrafluoroethylene impregnated glass fibre, thickness 0.005 ± 0.0005 inch;
  ii. polyethylene, thickness 0.005 inch;
  iii. glass, thickness 0.3 cm.

The results are shown in Table 1 in which column 2 indicates whether the current lead-in rod is present (in which case the compensating balance arm 16 is brought into use) or absent, column 3 indicates the dielectric material used as the sheet 4, column 4 indicates the difference in capacitance between the anode under test and the reference value of capacitance, and column 5 indicates acceptance or rejection of the anode depending on whether the capacitance reading is greater or less respectively than that of the reference value.

Table 1

Titanium blade anodes

| Example | Current lead-in rod Present/absent | Dielectric sheet | Capacitance reading relative to reference ± picofarads | Accepted/Rejected |
|---|---|---|---|---|
| 1 | Absent | PTFE/glass fibre | + 925 | Accepted |
|   | Present | PTFE/glass fibre | + 920 | Accepted |
| 2 | Absent | PTFE/glass fibre | + 840 | Accepted |
|   | Present | PTFE/glass fibre | + 830 | Accepted |
|   | Absent | polyethylene | +1010 | Accepted |
|   | Absent | glass | + 235 | Accepted |
| 3 | Absent | PTFE/glass fibre | − 270 | Rejected |
|   | Present | PTFE/glass fibre | − 240 | Rejected |
|   | Absent | polyethylene | − 185 | Rejected |
|   | Absent | glass | − 50 | Rejected |
| 4 | Absent | PTFE/glass fibre | − 405 | Rejected |
|   | Present | PTFE/glass fibre | − 400 | Rejected |
|   | Absent | polyethylene | − 390 | Rejected |
|   | Absent | glass | − 105 | Rejected |

Table 2

Titanium Louvred anodes

| Example | Current lead-in rod Present/absent | Dielectric sheet | Capacitance reading relative to reference ± picofarads | Accepted/Rejected |
|---|---|---|---|---|
| 5 | Absent | PTFE/glass fibre | + 930 | Accepted |
|   | Present | PTFE/glass fibre | + 930 | Accepted |
|   | Absent | polyethylene | +1180 | Accepted |
|   | Absent | glass | + 170 | Accepted |
| 6 | Absent | PTFE/glass fibre | + 440 | Accepted |
|   | Present | PTFE/glass fibre | + 480 | Accepted |
|   | Absent | polyethylene | + 510 | Accepted |
|   | Absent | glass | + 120 | Accepted |
| 7 | Absent | PTFE/glass fibre | − 170 | Rejected |
|   | Present | PTFE/glass fibre | − 730 | Rejected |
|   | Absent | polyethylene | − 750 | Rejected |
|   | Absent | glass | − 280 | Rejected |
| 8 | Absent | PTFE/glass fibre | − 800 | Rejected |
|   | Present | PTFE/glass fibre | − 805 | Rejected |
|   | Absent | polyethylene | − 870 | Rejected |
|   | Absent | glass | − 330 | Rejected |

EXAMPLES 5 TO 8

The anodes tested had a series of pressed-out titanium louvres as the working surface in conjunction with a titanium bridge piece and a titanium tube (with or without copper lead-in rod). The capacitance apparatus was calibrated against reference anodes which were of the same type and in which the distance between the lowest and the highest points on the working surface did not exceed 0.5 mm (as determined by the planetary fixture method), and the meter zero set corresponding to this capacitance. All the anodes tested were manufactured with a view to meeting this desired standard of flatness. None of the anodes was coated with an electrocatalytically active material.

The measurements were carried out using the dielectric sheets described in Examples 1 to 4. The results are shown in Table 2.

What we claim is:

1. A method of assessing the flatness of an anode which comprises measuring the capacitance of the electrical capacitor formed by urging towards each other under a predetermined load the working surface of the said anode and a rigid plane sheet of an electrically conducting material as the other plate of the capacitor with a sheet of dielectric material therebetween, said predetermined load being the weight of the anode.

2. A method as claimed in claim 1 wherein the rigid plane sheet is a flat plate of copper, iron or steel.

3. A method as claimed in claim 1 wherein the material of the dielectric sheet is selected from the group consisting of polyethylene, a fluorinated ethylene polymer, glass or mixtures thereof.

4. A method as claimed in claim 3 wherein the fluorinated ethylene polymer is polytetrafluoroethylene.

5. A method as claimed in claim 3 wherein the dielectric sheet is a mat of glass fibre impregnated with polytetrafluoroethylene.

6. A method as claimed in claim 1 wherein the dielectric sheet has a uniform thickness in the range 0.003 to 0.2 inch.

7. A method as claimed in claim 6 wherein the dielectric sheet has a uniform thickness of 0.005 inch.

8. A method as claimed in claim 1 wherein a predetermined load equivalent to the weight of the anode is effected by providing a compensating upthrust on the anode to offset any additional weight carried by the anode.

9. A method of assessing the flatness of each of a plurality of identical electrodes comprising providing a stationary horizontal plane base plate of an electrically conducting material, feeding a sheet of dielectric material to the upper surface of the base plate, lowering one of the anodes to be assessed into engagement with the dielectric sheet and urging the anode toward the dielectric sheet under a load equal to the weight of the anode, connecting electrical leads to the anode and base plate, and measuring the capacitance of the electrical capacitor formed by the anode, base plate and dielectric sheet.

10. A method as in claim 9 wherein the step of connecting an electrical lead to the anode adds weight to the anode, the method including the step of providing an upward thrust on the electrode equal to the added weight.

* * * * *